UNITED STATES PATENT OFFICE.

FREDERICK WILLIAM A. WIESEBROCK, OF NEW YORK, N. Y.

PROCESS OF MAKING MALTOSE AND DEXTROSE.

SPECIFICATION forming part of Letters Patent No. 641,910, dated January 23, 1900.

Application filed February 24, 1899. Serial No. 706,723. (No specimens.)

*To all whom it may concern:*

Be it known that I, FREDERICK WILLIAM A. WIESEBROCK, a citizen of the United States, and a resident of New York city, New York, have invented certain new and useful Improvements in Processes of Manufacturing Maltose, Dextrose, Malt-Sugar, and Kindred Articles, of which the following is a specification.

The object of this invention is to manufacture malt-sugar, such as maltose and dextrose, by a diastasic process, to provide means for facilitating and augmenting the saccharification of farinaceous substances by the diastasic process, to provide means of refining and clarifying such products, and to manufacture such products of pure quality, healthful as a food, to be used for brewing, confectionery, or other alimentary purposes.

To carry out my process, I use those cereals which, according to the percentage of starch contained therein, command the lowest price and malt the same, either in part or whole. The cereal used is usually corn or maize, and I will therefore describe the process as applied to it, though, of course, other cereals may be used.

A quantity of corn is cleaned from all adhering smut and immersed in water, to which is added a small amount—say about two hundredths of one per cent.—of phosphoric acid in order to prevent the formation of germs on the grain during the period of steeping, the phosphoric acid acting as an antiseptic. When the corn has absorbed about forty per cent. of its weight of steeping-water, with its small percentage of phosphoric acid, it is removed from the steeping-tanks and allowed to germinate into malted grain, using the usual precautions in the process as regards the temperature, moisture, and time. When the rootlet of the corn has acquired about twice the length of the kernel, germination is completed, for at this time the grain contains the greatest amount of diastasic ferment. I have found that the addition of phosphoric acid in small quantities, such as described, to the steeping-water also augments the quantity or power of the diastasic ferment in the germinated grain, whether it be corn, barley, or other grain, so that a malted grain of great diastasic quality will result. When the germination of the grain is completed, it is ground and the hully portion separated from the starchy or mealy portion with the aid of water and proper bolting and separating apparatus, the mealy portion being gathered in a separate vat from the hully portion. When the mealy portion has settled in the vat in which it has been mixed with water, the liquid above it, containing a great portion of the diastase, is now decanted from the settled mealy portion and placed in the vat containing the hully portion. This mash is then raised to a temperature of about 140° Fahrenheit by the admission of steam, and this temperature is maintained in order to convert the starchy substance thereof without diminishing the diastasic energy until the liquids and hully portion are used elsewhere, as will be described further below. The mealy portion after the liquid has been decanted from it is charged, together with about twice its weight of water, into a converter, preferably of the Hollofreund pattern, and here subjected to a cooking of about one hour's duration at a pressure of about forty pounds to the square inch. When this point is reached, the cooking is stopped and the contents of the cooker are rapidly cooled by suitable means to a temperature of about 140° Fahrenheit, after which the liquid and hully portion are introduced into and mixed with the charge in the converter, both mashes having now in the mixed state the temperature of 140° Fahrenheit. The mash prepared from the decanted liquid of the mealy portion and the hully portion of the grain, having all the diastasic properties originally contained therein intact on account of the temperature maintained therein, now acts on the mash in the cooker and almost immediately converts the same into maltose and dextrine in the proportions of about sixty-six per cent. maltose to thirty-four per cent. dextrine. In order to facilitate and augment the dialytic fermentation of the diastase, I now charge the cooker with carbonic-acid gas at a pressure of between forty to sixty pounds to the square inch, keeping the temperature of the mash between 140° and 150° Fahrenheit, and mixing the same with the gas by agitation. The action of the carbonic-acid gas now assists and strengthens the diastasic action and reduces the percentage of the dextrine relative to maltose in proportion to the time of duration of action, so that an action of the gas of about one hour's duration converts practically all dextrine into maltose. The effect of carbonic-acid gas on a mash containing diastase is to prevent the coagulation of the diastase, which coagulation prevents the further conversion of the starch into dextrine and maltose, and subsequently the conversion of dextrine into maltose and of maltose into dextrose. When the saccharification process has thus been carried to the desired point, according to the purpose for which the product is to be used, the mash is filtered to separate the solid matter from a clear wort, either by special filtering devices or by means of a filtering-vat with perforated false bottom, such as are used in breweries. If the finished product is to be an ordinary malt-syrup containing only maltose, dextrine, &c., as in ordinary beer-wort, the wort may now, as it comes from the filters, be concentrated in a vaccum-pan to the desired consistency and placed on sale. If, however, a maltose or dextrose syrup of great clearness and purity is desired, it becomes necessary to eliminate the gluten and other albuminous substances from the product. To do this, I proceed as follows: Either I subject the liquid to be treated to a freezing process until said impurities show distinct signs of congelation, while the liquid sugar-containing portion is still limpid fluid, and in this state remove said impurities by filtration, or I proceed in the following manner, which for practical purposes is more rational: The wort when filtered from the solid matter, as described, is usually of a specific gravity of from 12° to 15° Balling. This gravity I have found to be not as convenient for this treatment as a wort of from 25° to 30° Balling density. I therefore concentrate the wort as it comes from this first filtration in a vacuum-pan under a low temperature to the above gravity and cool the same to a temperature of from 32° to 40° Fahrenheit. I then subject the wort again to the action of carbonic-acid gas at a pressure of about sixty pounds to the square inch, when practically all gluten and vegetable albuminoids and non-maltose ingredients of the wort coagulate sufficiently to be removed from the liquid by filtration or precipitation and decantation. After the removal of the objectionable ingredients the concentration in vacuum may be resumed to the required consistency and the resultant product, a slightly-colored maltose-syrup of great clearness, is excellently adapted for the brewing of pale beer of good quality and other purposes. The temperature of the wort and tension of the gas, together with the duration of the treatment, enables the operator to remove a greater or less percentage of the above ingredients, so that the degree of clarification is in the hands of the operator. If, for instance, beer-wort after having undergone the process of boiling with hops and has been cooled down to about 35° Fahrenheit is treated with carbonic-acid gas, as described, and filtered clear from the thus-coagulated impurities before the same is brought to fermentation, the beer produced is of far better aroma and flavor than the beer made by the old process. By removing the superfluous glutinous and other albuminous substances in this manner the process of fermentation and clarification of the beer is also greatly facilitated and shortened, and the yeast is maintained purer, because of its not coming in lengthy contact with the nitrogenous and readily-changing substances, which by the old process of brewing are only removed by tedious and lengthy storage of the beer and during a slow after fermentation.

When the finished product is to be of great sweetness and of a perfect clearness and brilliancy, intended for confectionery and other purposes, I proceed as follows: The process of malting and saccharification up to the point of separating the wort from the solid matter is carried on, as hereinbefore described. When the wort is filtered from the solid matter in the first filtration, (care being taken to maintain the temperature always between 140° and 150° Fahrenheit, so as not to destroy the diastasic ferment by overheating,) the clear filtered wort is again charged into a converter constructed similar to the one described, but having also a steam-jacket, so as to enable the temperature of the wort to be regulated without admitting direct steam to dilute the same. The wort in this converter is now charged with carbonic-acid gas at a pressure of about sixty pounds to the square inch and agitated therewith, while the temperature is gradually increased to about 160° Fahrenheit, and by this process a resaccharification takes place through the action of the diastase and gas and the wort is converted from maltose into dextrose of great sweetness and purity and far superior to the acid-converted glucose and grape-sugar as manufactured heretofore. The duration of the treatment regulates the degree of conversion.

The process of "defecation," as the elimination of albuminous and other matter from sugar-juice is called, is accomplished by my process without the aid of alkalies or lime. The juices treated in a cold state with the gas, as described, are therefore purer and yield a greater amount of sugar and less molasses.

The sugar-juices are best treated immediately after they come from the sugar-cane press or the beet leaching or pressing apparatus.

After having used the carbonic-acid gas in any of the described treatments the same can be gathered in any suitable reservoir after having been purified from any objectionable impurities, and thus recovered can be used over again.

When the articles to be manufactured are to be colorless syrups or in solid form, such as white malt-sugar, the product must be filtered for decolorization over bone-black at the proper stage of the process, and if an anhydrous malt-sugar is desired I concentrate the clarified syrup to the point of crystallization, separate the crystallized sugar from the syrup by centrifuging, dry the sugar, melt the first-obtained sugar over again a second or third time at as low a temperature as possible, then allow crystallization again, centrifuging the sugar from the syrup and drying it each time before further treatment in the usual manner. By these means of retreating the sugar several times an anhydrous white sugar of great sweetness and without possessing the defect of ordinary grape-sugar of being very hydroscopic is obtained.

What I claim is—

1. A step in the process of manufacturing maltose, dextrose and malt-sugar, which consists in separating the meal from the hull of the malt, separating the diastase from the meal, cooking the meal, adding the diastase together with the hull to the cooked meal, and mashing the product in the presence of carbonic-acid gas, substantially as specified.

2. A step in the process of manufacturing maltose, dextrose and malt-sugar, which consists in coagulating the glutinous and albuminous impurities of the mash by treating the mash with carbonic-acid gas at a low temperature, and removing such coagulated impurities, substantially as specified.

3. The process of manufacturing maltose, dextrose and malt-sugar, which consists in separating the meal from the hull of the malt, separating the diastase from the meal, cooking the meal, adding the diastase together with the hull to the cooked meal, mashing the product in the presence of carbonic-acid gas, coagulating the glutinous and albuminous impurities by retreating the mash with carbonic-acid gas at a low temperature, and removing the coagulated impurities, substantially as specified.

Signed by me at New York city, New York, this 16th day of February, 1899.

FREDERICK WILLIAM A. WIESEBROCK.

Witnesses:
F. V. BRIESEN,
WILLIAM MILLIAM.